United States Patent [19]

Matsuo

[11] Patent Number: 5,132,628
[45] Date of Patent: Jul. 21, 1992

[54] ERROR DETECTING DEVICE FOR ELECTRONIC EQUIPMENT

[75] Inventor: Yoichi Matsuo, Tokyo, Japan

[73] Assignee: NEC Corporation, Japan

[21] Appl. No.: 491,166

[22] Filed: Mar. 9, 1990

[30] Foreign Application Priority Data

Mar. 13, 1989 [JP] Japan .................. 1-61167

[51] Int. Cl.⁵ .................. G01R 31/02; G08B 21/00
[52] U.S. Cl. .................. 324/511; 324/556; 340/635; 340/508
[58] Field of Search ........... 324/500, 511, 537, 556, 324/158 MG, 555; 340/517, 635, 644, 648, 653, 679, 506–508

[56] References Cited

U.S. PATENT DOCUMENTS 3,623,056 11/1971 Elston .................. 340/517
3,646,552 2/1972 Fuhr .................. 340/517 X Primary Examiner—Jack B. Harvey
Attorney, Agent, or Firm—Leydig, Voit & Mayer

[57] ABSTRACT

A device for detecting errors of a plurality of electric parts which are built in electronic equipment has error detecting circuits in the form of relays. The relays are interconnected one-to-one to various electric parts which are the subject of error detection, while display circuits are interconnected one-to-one to the relays. Output signals of the relays are fed to a reporting circuit without the intermediary of the display circuits. When an electric part is free from an error and only a display circuit associated therewith has failed, no error signal is fed to the reporting circuit. Only when any of the electric parts has really failed, an error signal is delivered to the reporting circuit to cause the latter to take an adequate measure such as the interruption of power supply.

6 Claims, 5 Drawing Sheets

ERROR DETECTING DEVICE FOR ELECTRONIC EQUIPMENT

BACKGROUND OF THE INVENTION

The present invention relates to a device for detecting errors of a plurality of electric parts which are built in electronic equipment and, more particularly, to a device for detecting errors of fans included in a cooling system which forms a part of a computer.

An error detecting device is installed in many of modern electronic equipment for detecting and reporting errors of various electric parts of the equipment and thereby uging actions. In a computer, for example, a great number of circuit packages each having integrated circuits (ICs) and electronic parts such as capacitors and resistors therein are accommodated in a housing, each IC including transistors and other electronic parts. A cooling system implemented by a plurality of fans is arranged in the housing to cool the eletronic parts which are the source of heat generation. When any of the fans fails to operate properly due to some cause, it is likely that the circuit packages, i.e., the individual electronic parts loaded thereon are heated to become practically inoperable. In the light of this, an error detecting device is usually associated with the cooling system and arranged such that, on detection of an error of any of the fans, it cuts off the power supply to the computer automatically or takes a similar measure. While such as error detecting device has been proposed in various forms, prior art devices cannot show which of the fans has failed specifically or, if they can do so, the reliability of operation is not satisfactory.

SUMMARY OF THE INVENTION

It is therefore an object of the present invention to provide an error detecting device capable of detecting errors of a plurality of electric parts built in electronic equipment surely and reliably.

It is another object of the present invention to provide an error detecting device capable of determining which of electric parts bulit in electronic equipment has failed immediately.

It is another object of the present invention to provide an error detecting device for detecting errors of a cooling system installed in a computer.

It is another object of the present invention to provide a generally improved error detecting device for electronic equipment.

A device for detecting errors of a plurality of electric parts built in electronic equipment of the present invention comprises error detecting circuits each being associated with respective one of the electric parts for generating a first and a second error signal representative of an error of associated one of the electric parts, a reporting circuit responsive to the first error signal for reporting that an error has occurred in any of the electric parts, and display circuits each being associated with respective one of the error detecting circuits and responsive to the second error signal for displaying that the electric part associated with associated one of the error detecting circuits has failed.

BRIEF DECRIPTION OF THE DRAWINGS

The above and other objects, features and advantages of the present invention will become more apparent from the following detailed description taken with the accompanying drawings in which.

DESCRIPTION OF THE PREFERRED EMBODIMENT

While the present invention is applicable to various kinds of electric parts installed in electronic equipment, it will be described in relation to the cooling system of a computer by way of example. To better understand the present invention, a brief reference will be made first to a cooling system of a computer and a conventional error detecting device associated with fans which are included in the cooling system.

Figure 1:
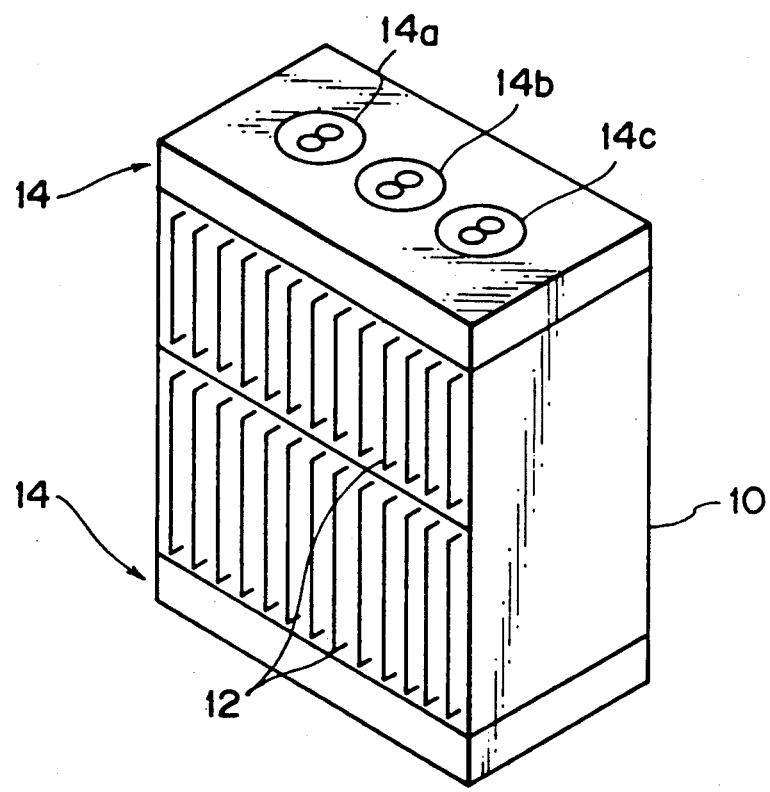
FIG. 1 is a perspective view of electronic equipment having a housing in which circuit packages are accommodated, and an arrangement for cooling the circuit packages.

Referring to FIG. 1 of the drawings, a computer usually has a housing 10 which accommodates a number of circuit packages 12 each being loaded with ICs and various electronic parts such as resistors and capacitors. A cooling system, generally 14, is built in the housing 10 for cooling the electronic parts which generate heat. The cooling system 14 has a plurality of upper fans 14a, 14b and 14c mounted on the top of the housing 10, and a plurality of lower fans 16a, 16b and 16c (FIG. 2) mounted on the bottom of the housing 10. The circuit packages 12 are cooled by the lower fans 16a to 16c which draw air into the housing 10 and the upper fans 14a to 14c which draws it out. When the cooling system 14 stops operating due to some error, the circuit packages 12 will be heated and fail to operate properly. To eliminate such an occurrence, an error detecting device is associated with the cooling system 14 so that, when it detects an error, appropriate measures such as the interruption of power supply to the circuit packages 12 may be taken.

Figure 2:
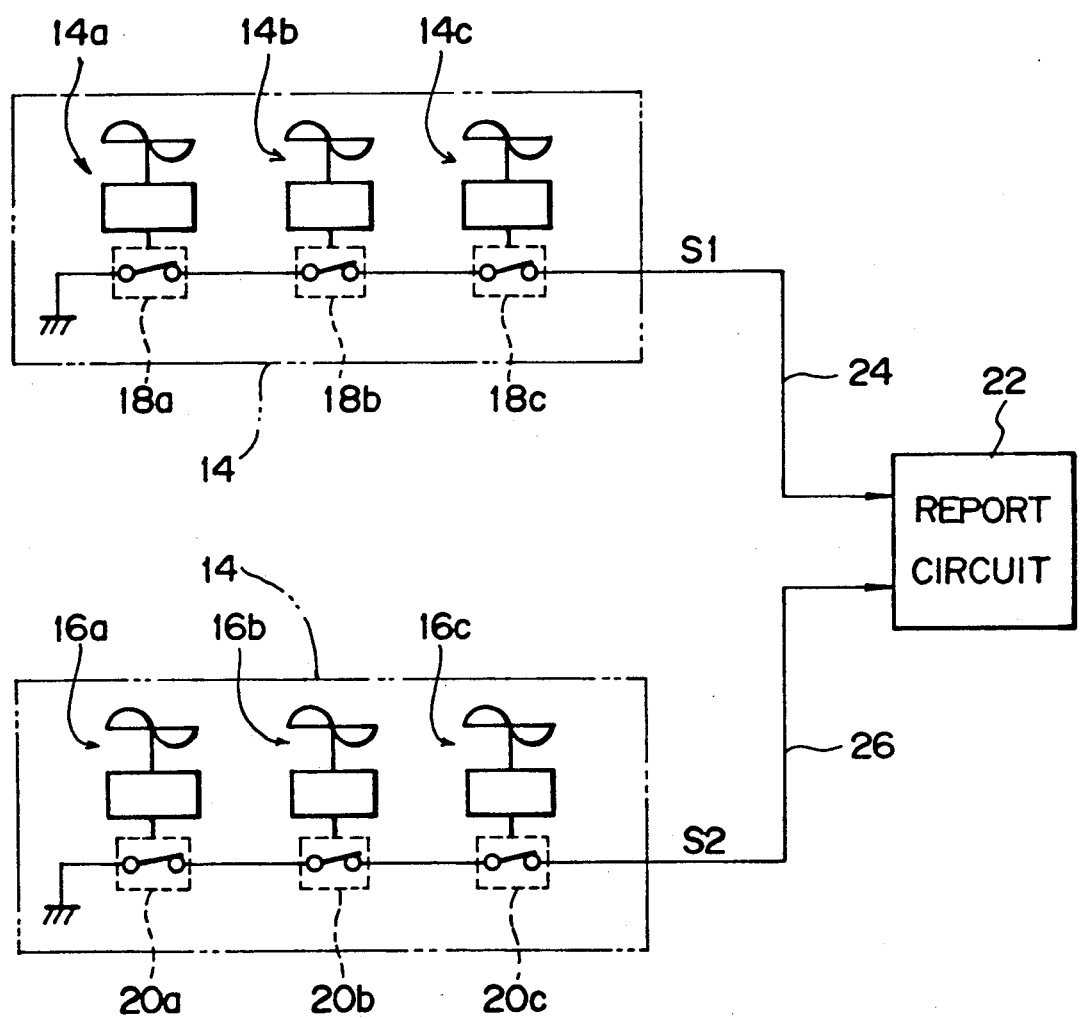
FIG. 2 is a block diagram schematically showing a prior art error detecting device.

FIG. 2 shows one of error detecting devices heretofore proposed. As shown, the prior art error detecting device has error detecting circuits 18a, 18b and 18c which are interconnected to the upper fans 14a, 14b and 14c, respectively. Each of the error detecting circuits 18a to 18c is implemented by a single relay which is normally closed and is opened in the event of a failure of the associated fan. Likewise, error detecting circuits 20a, 20b and 20c are interconnected to the lower fans 16a, 16b and 16c, respectively, and each is implemented by a normally closed relay. Both the error detecting circuits 18a to 18c and the error detecting circuits 20a are 20c are interconnected in series. Output signals S1 and S2 of such two serial connections are fed to a reporting circuit 22 by cables 24 and 26, respectively. When any one of the fans 14a to 14c and 16a to 16c fails, the relay of one of the error detecting circuits 18a to 18c and 20a to 20c associated with the failed fan is opened to interrupt the supply of the signal S1 or S2 to the reporting circuit 22. Then, the reporting circuit 22 determines that an error has occurred and informs the computer of the error. In response, the computer stops the power supply to the circuit packages 12.

However, the prior art device having the above construction has a problem left unsolved. Specifically, although it can determine that an error has occurred in the fans, it cannot indicate which of the fans has failed specifically.

Figure 3:
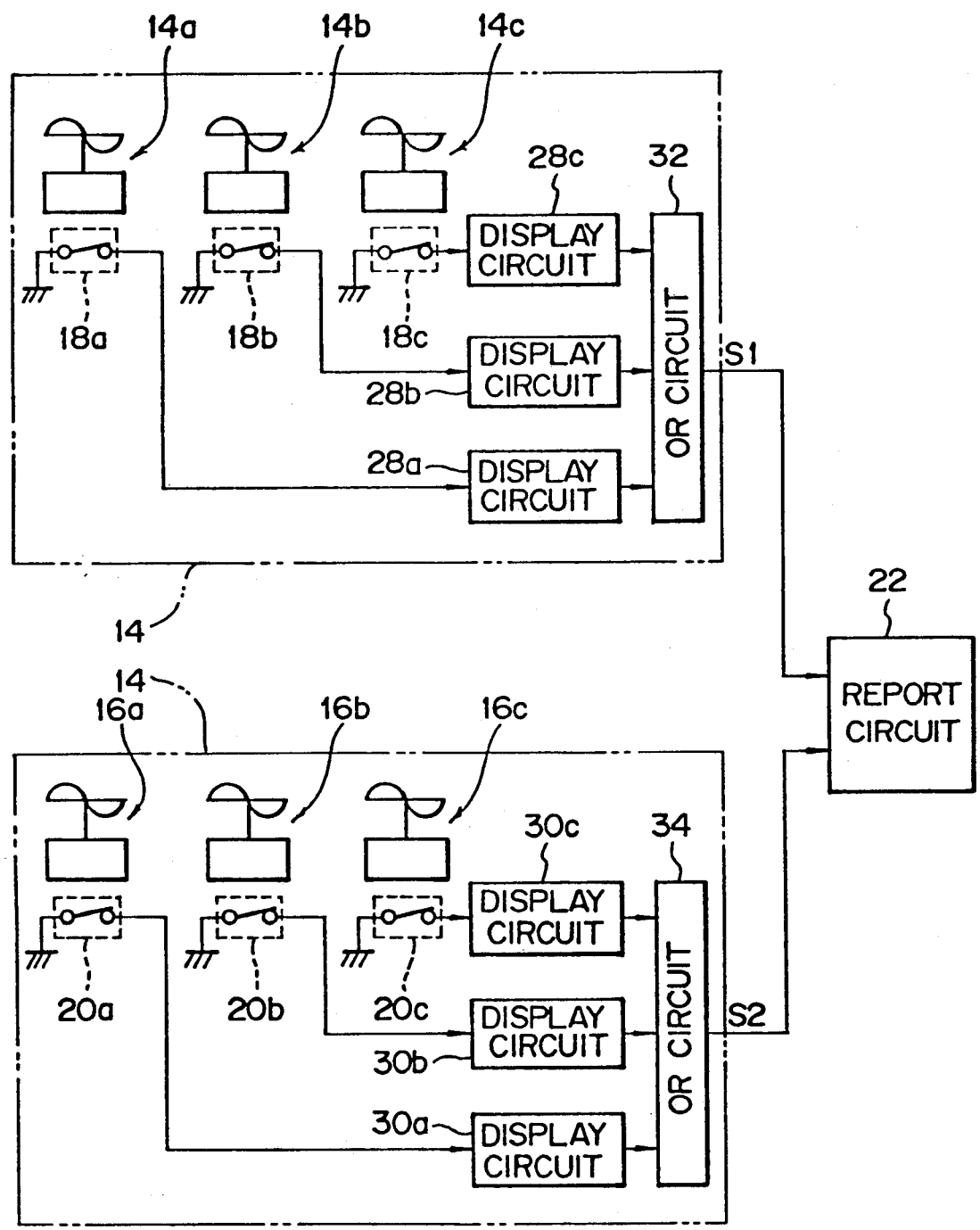
FIG. 3 is a block diagram schematically showing another prior art error detecting device.

FIG. 3 shows another prior art error detecting device which is provided with an implementation for derermining which of the fans 14a to 14c and 16a to 16c has failed. Specifically, the relays of the error detecting circuits 18a, 18b and 18c are interconnected to display circuits 28a, 28b and 28c, respectively. Likewise, the relays of the error detecting circuits 20a, 20b and 20c are interconnected to display circuits 30a, 30b and 30c, respectively. The display circuits 28a to 28c are interconnected to an OR circuit 32, while the display circuits 30a to 30c are interconnected to an OR circuit 34. In this configuration, the display circuits 28a to 28c and 30a to 30c display errors which are detected by their associated error detecting circuits 18a to 18c and 20a to 20c. When the output of any of the display circuits 28a to 28c and 30a to 30c representative of an error is fed to the OR circuit 32 or 34, the OR circuit received the display output delivers an output signal S1 or S2 thereof to the reporting circuit 22. Each of the display circuits 28a to 28c and 30a to 30c has a lamp for indicating a location where the error has occurred.

The prior art device shown in FIG. 3 is advantageous over the device of FIG. 2 in that it allows a fan in failure to be to be identified immediately by causing the lamp associated with that fan to glow. However, since the output signals of the error detecting circuits 18a to 18c and 20a to 20c are routed through the associated display circuits 28a to 28c and 30a to 30c and OR circuits 32 and 34 to the reporting circuit 22, the reliability of error detection achievable with the device is limited. High reliability in error detection is a prequisite considering the fact that the interruption of operation of a computer has a far-reaching influence on the system which is implemented by the computer. It is important, therefore, that an error signal be fed to the reporting circuit only when any of the fans has really failed, and that the fan having failed be located to urge prompt repair.

Figure 4:
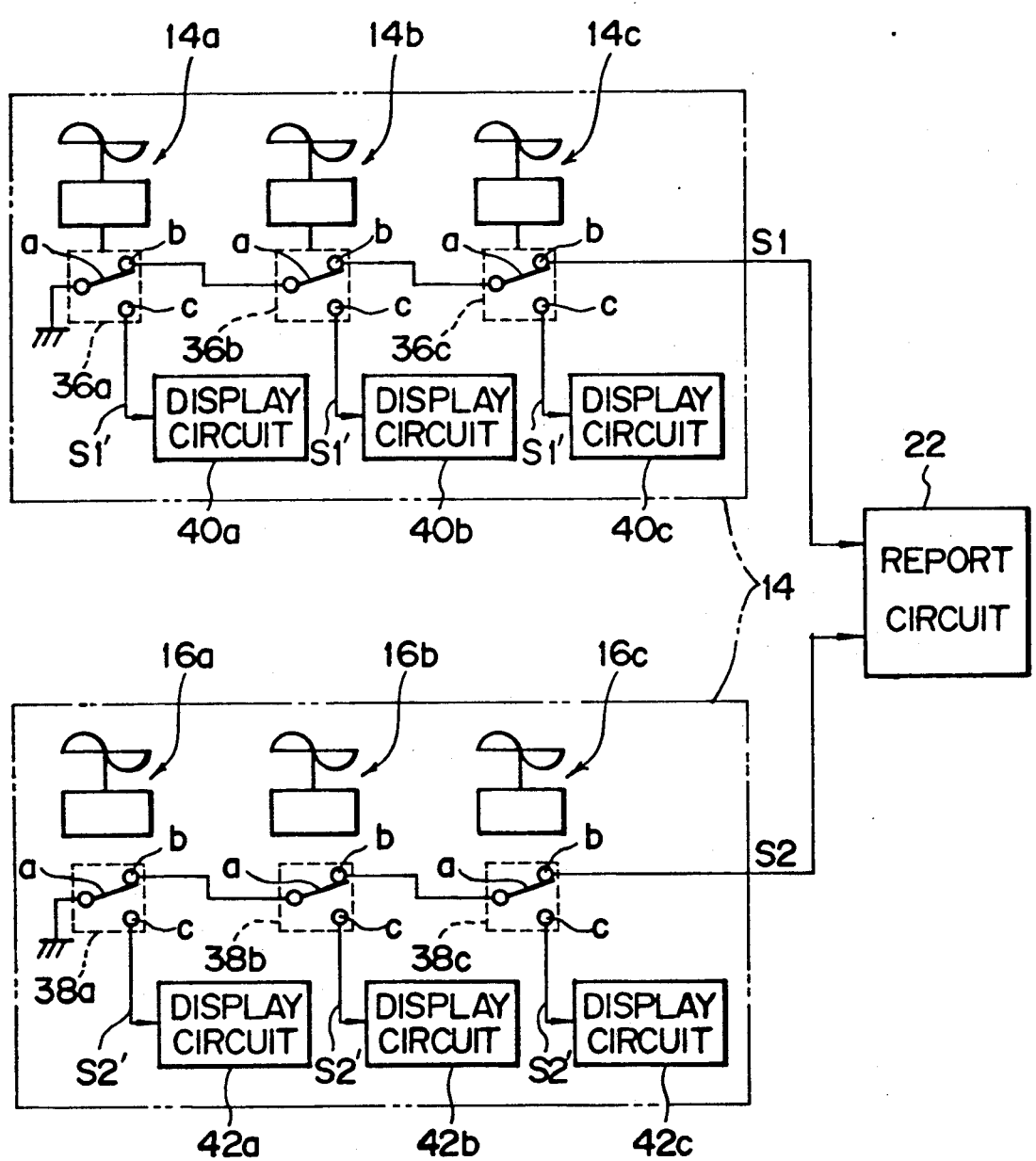
FIG. 4 is a schematic block diagram showing an error detecting device embodying the present invention.

Referring to FIG. 4, a preferred embodiment of the error detecting device in accordance with the present invention is shown. In the figures, the same or similar components are designated by like reference numerals, and redundant description will be avoided for simplicity.

FIG. 4, the error detecting device has error detecting circuits 36a, 36b and 36c and error detecting circuits 38a, 38b and 38c which are respectively interconnected to upper fans 14, 14b and 14c and lower fans 16a, 16b and 16c of a cooling system 14. The error detecting circuits 36a to 36c and 38a to 38c are each implemented by a relay having a movable armature a and a pair of contacts b and c. The movable armature a will be switched from the contact b to the contact c when an error occurs in one of the fans associated with the error detecting circuit. All the associated contacts b are interconnected in series. The serial connection of the contacts b is interconnected at one end to ground and at the other end to a reporting circuit 22. The contacts c are interconnected one-to-one to exclusive display circuits 40a, 40b and 40c and display circuits 42a, 42b and 42c, as illustrated.

In operation, assume that the fan 14a has failed by way of example. Then, the armature a of the error detecting circuit 36a interconnected to the fan 14a is switched into connection with the contact c with the result that the serial connection of the contacts b is opened. Hence, the supply of a signal S1 to the reporting circuit 22 is interrupted. In response, the circuit 22 informs a computer of the computer having occurred in the cooling system 14, while requesting appropriate processing such as the stop of power supply to the circuit packages 12. On the other hand, the display circuit 40a associated with the fan 14a of interest receives a signal S1' from the error detecting circuit 36a which is respresentative of the switchover of the armature a to the contact c. In response, the display circuit 40a turns on its lamp.

Figure 5:
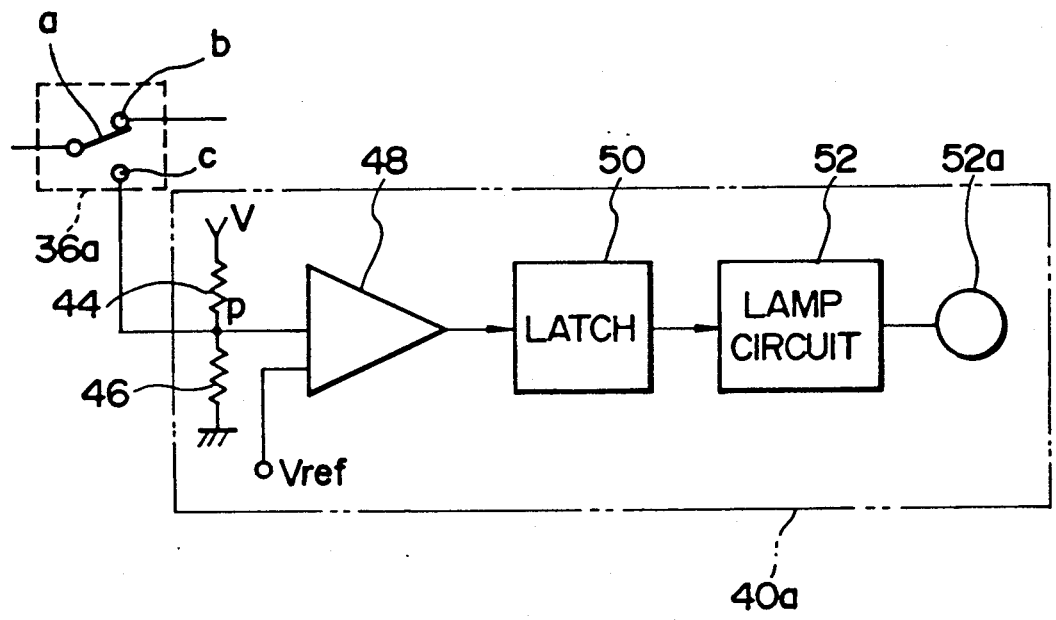
FIG. 5 is a schematic block diagram respesentative of a specific construction of a display circuit included in the illustrative embodiment.

FIG. 5 shows a specific construction of the individual display circuits 40a to 40c and 42a to 42c. As shown, each display circuit includes a serial connection of two resistors 44 and 46 which is interconnected at one end to a power source V and at the other end to ground. The relay contact c is interconnected to the junction p of the resistors 44 and 46. A comparator 48 compares a voltage appearing on the contact c with reference voltage Vref to see if the armature a is open, i.e., if it is connected to the contact c. A latch 50 latches the output of the comparator 48. A lamp driver 52 turns on a lamp 52a in response to an output signal of the latch 50. When an error of the fan 14a is detected, the lamp of the display circuit 40a associated with the fan 14a glows to show which of the fans has failed. The illustrative embodiment, therefore, is capable of determining which of the upper fans 14a to 14c and lower fans 16a to 16c has failed on the basis of the signal S1 or S2 and, at tha same time, allowing the fan having failed to be identified on the basis of the lamp.

It is to be noted that the latch 50 shown in FIG. 5 is omissible when use is made of error detecting circuitry of the type which does not change the states of the contacts b and c even after the power supply has been interrupted in response to an error of a fan.

As stated above, in the illustrative embodiment, an output signal to be fed from a cooling system to a reporting circuit to urge a computer to cut off the power supply or otherwise cope with an error immediately and an output signal to be fed from the cooling system to a display circuit for identifying a fan in failure are implemented independently of each other.

In summary, in accordance with the present invention, error detecting circuits in the form of relays are associated one-to-one with various electric parts which are the subject of error detection, and output signals of the relays are fed to a reporting circuit without the intermediary of display circuits. This is successful not only insuring the reliability of operation of the reporting circuit but also in indentifying an electric part in failure immediately due to a display circuit. When the electric part is free from an error and only the display circuit associated therewith has failed, no error signal is fed to the reporting circuit. Hence, electronic equipment having such electric parts can operate without interruption and suffers from a minimum of downtime as a whole. More specifically, only when any of the electric parts has really failed, an error signal is delivered to the reporting circuit to cause the latter to take an adequate measure such as the cut-off of power supply, thereby protecting the electronic equipment from damage. At the time of repair, the display circuit allows one to find the electric part in failure immediately and, therefore, to recover the equipment within a short period of time. This minimizes the influence of the failure on the entire system.

Various modifications will become possible for those skilled in the art after receiving the teachings of the present disclosure without departing from the scope thereof. For example, while the illustrative embodiment has been shown and described in relation to a cooling system having upper fans and lower fans, the present invention is also applicable to any other type of cooling system so far as it has plurality of fans. The present invention is practicable not only with fans included in a cooling system but also with other various kinds of electric parts whose errors can be detected. Of course, a computer is merely an example of a wide range of applications of the present invention.

What is claimed is:

1. A device for detecting errors of a plurality of electric parts with built in electronic equipment, comprising:
   error detecting circuits respectively associated with each of the plurality of the electric parts for generating a first and a second error signal representative of an error associated with one of said electric parts;
   a reporting circuit responsive to said first error signal for reporting that an error has occurred in any of said electric parts; and
   display circuits each being associated with respective one of said error detecting circuits and responsive to said second error signal for displaying that the electric part associated with each of the respective error detecting circuits has failed.

2. A device as claimed in claim 1, wherein each of said error detecting circuits comprises a single relay having a first contact which is normally closed and is opened in response to an error, and a second contact which is normally open and is closed in response to an error.

3. A device as claimed in claim 2, wherein said reporting circuit is interconnected to a serial connection of said first contacts of said relays, said first error signal being generated when any of first contact is opened.

4. A device as claimed in claim 2, wherein each of said display circuits is connected to said second contact of associated one of said relays, said second error signal being generated when said second contact is closed.

5. A device as claimed in claim 1, wherein the electronic equipment comprises a computer, the electric parts comprising a plurality of fans included in a cooling system of said computer.

6. An apparatus for detecting errors in a plurality of external electric parts comprising:
   error detecting circuits respectively associated with each of the plurality of the electric parts, each error detecting circuit having a relay means including a first contact generating a first error signal and a second contact generating a second error signal, the first error signal and the second error signal being responsive to the respective relay means being actuated by an error in one of the plurality of the electric parts respectively associated with each of the error detecting circuits;
   a reporting circuit responsive to said first error signal for reporting that an error has occurred in any of said electric parts; and
   display circuits, each being associated with one of the respective plurality of relay means, and responive to said second error signal for display that the electric part associated with one of the plurality or relay means has failed.

* * * * *

UNITED STATES PATENT AND TRADEMARK OFFICE
CERTIFICATE OF CORRECTION

PATENT NO. : 5,132,628

DATED : July 21, 1992

INVENTOR(S) : Yoichi Matsuo

It is certified that error appears in the above-identified patent and that said Letters Patent is hereby corrected as shown below:

Claim 6, column 6, line 33, change "responive" to --responsive--;

Claim 6, column 6, line 34, change "display" to --displaying--;

Claim 6, column 6, line 35, change "or" to --of--.

Signed and Sealed this

Twelfth Day of October, 1993

*Attest:*

*Attesting Officer*

BRUCE LEHMAN

Commissioner of Patents and Trademarks